Aug. 30, 1932.  L. E. BAER  1,874,851
COLLAR HOLDER
Filed Sept. 22, 1931
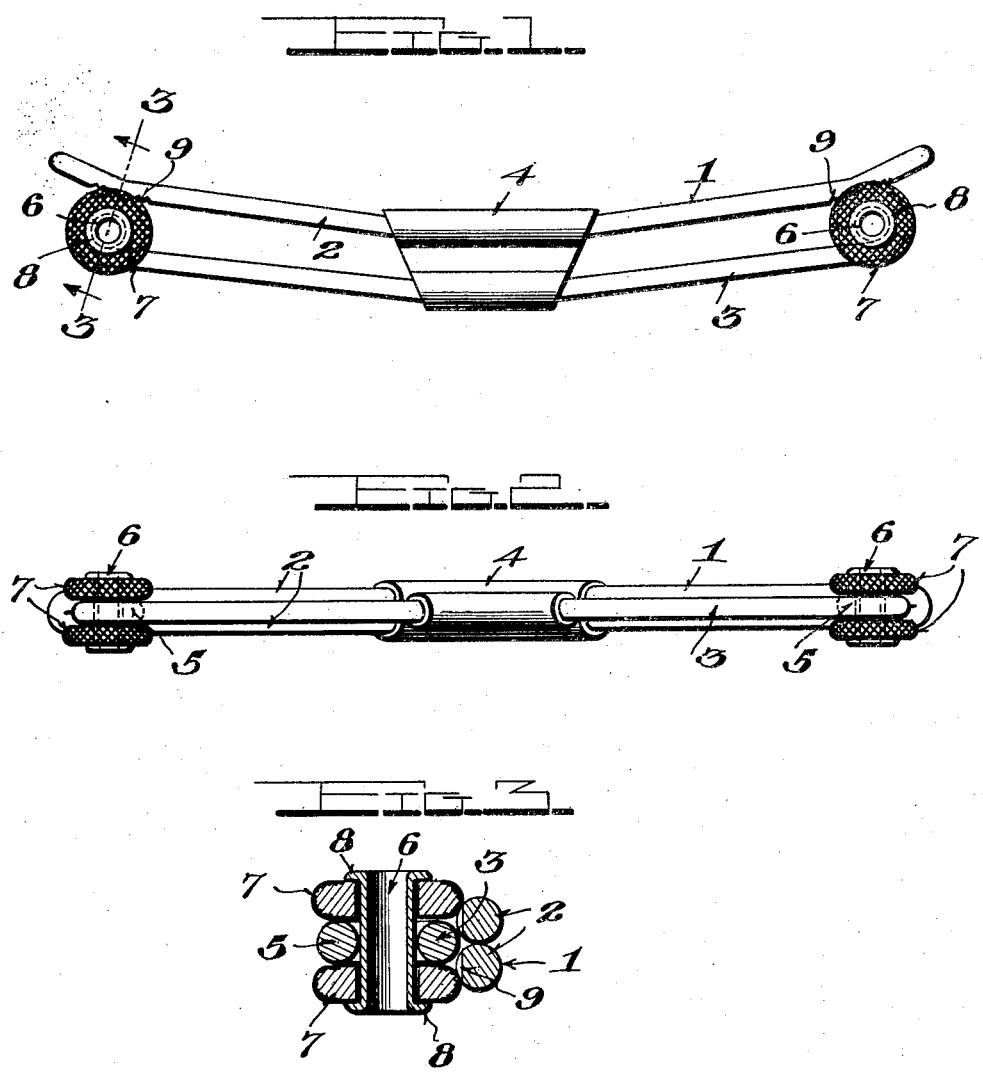
Inventor
Lawrence E Baer
By Joseph A Miller
Attorney Patented Aug. 30, 1932

1,874,851

UNITED STATES PATENT OFFICE

LAWRENCE E. BAER, OF ATTLEBORO, MASSACHUSETTS, ASSIGNOR TO THE BAER & WILDE COMPANY, OF ATTLEBORO, MASSACHUSETTS

COLLAR HOLDER

Application filed September 22, 1931. Serial No. 564,335.

This invention relates to certain new and useful improvements in collar holders and the primary object thereof is to provide a holder which has improved means for facilitating its positioning on the collar ends and at the same time to secure the holder to the collar ends so as to prevent movement or shifting of the holder subsequent to its positioning.

The invention further aims to provide a holder of this type which is possessed of the above-advantages and which at the same time is of simple construction and can be easily and economically produced.

In the drawing:

Figure 1 is a top plan view of the invention;

Figure 2 is a front elevation; and

Figure 3 is an enlarged section on line 3—3 of Figure 1.

In proceeding in accordance with the present invention a back bar 1 is provided which is composed of a wire or rod-like member having superimposed parts 2 as shown in Figure 3, the back bar being curved so as to generally conform to the shape of the neck. A front bar 3 of a shape corresponding to that of the rear bar 1 is employed and is secured to the central portion of the back bar 1 by a holding clip 4, which latter may be of any desired construction or form. The ends of the front bar 3 are curled to form eyes or loops 5 through which a preferably hollow rivet 6 extends. Referring to Figures 2 and 3 it will be noted that the front bar 3 and its eyes 5 are in register with the abutting portions 2 of the rear bar 1. A pair of rollers 7 are mounted on opposite sides of the eyes 5 and receive the hollow rivets 6 therethrough the ends of the rivets being headed at 8 so as to hold the rollers 7 against movement away from the eyes 5, and at the same time to provide an axis upon which the rollers 7 may freely and independently turn or rotate. The rollers have knurled or milled or otherwise roughened peripheries and lie opposite to corresponding roughened portions 9 on the free ends of the members 2 that constitute the rear bar. Referring to Figure 3 of the drawing it will be noted that the rollers 7 upon being engaged with the collar ends will pinch the latter between their peripheries and the roughened portions 9 of the rear bar and at the same time will effect engagement with the collar end so that portions thereof will be held between the eyes 5, each of the members 2, and each of the rollers, and due to the roughening of the rollers and the parts 9, it will be apparent that the collar ends will be effectively gripped and the holder prevented from accidental shifting or other movement with respect to the collar ends. It will further be apparent that due to the rollers being freely rotatable, the device may be more readily engaged with the collar ends and positioned thereon. While two rollers are illustrated in the drawing, nevertheless it will be understood that a greater number of rollers may be employed if desired and that other changes within the spirit and scope of the invention as announced by the appended claims may be made.

Having thus described my invention what I claim as new and desire to secure by Letters Patent is:

1. A collar holder having a rear bar composed of two superimposed members, a front bar having its ends curled to form eyes which latter lie opposite the abutting points of the superimposed members, means intermediate the ends of the bars to connect same, rollers having roughened peripheries disposed on opposite sides of the eyes, the parts of the superimposed members which lie adjacent to the eyes and to the rollers being roughened, and hollow rivets freely extending through the rollers and eyes and having headed ends to mount the rollers for free rotation.

2. A collar holder having a rear bar composed of two superimposed members, a front bar having its ends curled to form eyes which latter lie opposite the abutting points of the superimposed members, means intermediate the ends of the bars to connect same, rollers having roughened peripheries disposed on opposite sides of the eyes, the parts of the superimposed members which lie adjacent to the eyes and to the rollers being roughened, and means to rotatably mount the rollers.

3. A collar holder having a rear bar composed of two superimposed members, a front bar, means intermediate the ends of the rear and front bars to connect same, said front bar having eyes which lie opposite to the points of abutment of the superimposed members, rollers, and means to mount the rollers on opposite sides of the eyes for cooperation with the parts of the superimposed members which lie adjacent to the rollers.

In testimony whereof I have signed my name to this specification.

LAWRENCE E. BAER.